United States Patent
Lemen et al.

(10) Patent No.: US 11,420,468 B2
(45) Date of Patent: Aug. 23, 2022

(54) WHEEL HUB AND BEARING ASSEMBLY PACKAGING

(71) Applicant: KIC LLC, Vancouver, WA (US)

(72) Inventors: Aaron Lemen, Vancouver, WA (US); Pengchong Li, Vancouver, WA (US)

(73) Assignee: KIC, LLC, Vancouver, WA (US)

( * ) Notice: Subject to any disclaimer, the term of this patent is extended or adjusted under 35 U.S.C. 154(b) by 124 days.

(21) Appl. No.: 17/034,920

(22) Filed: Sep. 28, 2020

(65) Prior Publication Data

US 2021/0008925 A1    Jan. 14, 2021

Related U.S. Application Data

(62) Division of application No. 15/820,780, filed on Nov. 22, 2017, now Pat. No. 10,814,672.
(Continued)

(51) Int. Cl.
*B65D 85/58* (2006.01)
*B60B 27/00* (2006.01)
(Continued)

(52) U.S. Cl.
CPC ...... *B60B 27/0073* (2013.01); *B60B 27/0078* (2013.01); *B60B 27/0094* (2013.01);
(Continued)

(58) Field of Classification Search
CPC . B60B 27/00; B60B 27/0073; B60B 27/0078; B60B 27/0094; B60B 27/02; B65D 85/58; B65D 85/00; B65D 85/02; B65D 85/06; F16C 41/04; F16C 35/067; F16C 35/06; F16C 35/04
(Continued)

(56) References Cited

U.S. PATENT DOCUMENTS 4,846,343 A * 7/1989 Rupert .................. B65D 85/04
                                                      242/129
5,361,903 A * 11/1994 Thiele .................. G11B 23/027
(Continued)

FOREIGN PATENT DOCUMENTS

CN       105523279 A    4/2016
EP         1715202 A2  10/2006
(Continued)

*Primary Examiner* — Javier A Pagan
(74) *Attorney, Agent, or Firm* — Miller Nash LLP

(57) ABSTRACT

A packaging system having an outboard guard and an outboard retainer cap. The outboard guard includes an outboard guard opening having a hole through the planform of the outboard guard, an engagement portion having an annular surface radially surrounding the outboard guard opening, an outboard bearing protector portion having an annular surface radially surrounding the engagement portion of the outboard guard, and an outer rim having an annular surface radially surrounding the outboard bearing protector portion. The outboard retainer cap is configured to be removably affixed to the outboard guard and includes an outboard alignment protrusion having a circular surface, an engagement portion having an annular surface radially surrounding the outboard alignment protrusion, and a retaining flange having an annular surface radially surrounding the engagement portion of the outboard retainer cap.

8 Claims, 13 Drawing Sheets

Related U.S. Application Data

(60) Provisional application No. 62/517,591, filed on Jun. 9, 2017, provisional application No. 62/425,174, filed on Nov. 22, 2016.

(51) Int. Cl.
 *B60B 27/02* (2006.01)
 *F16C 19/54* (2006.01)
 *F16C 35/067* (2006.01)
 *F16C 41/04* (2006.01)
 *F16C 19/36* (2006.01)

(52) U.S. Cl.
 CPC .............. *B60B 27/02* (2013.01); *B65D 85/58* (2013.01); *F16C 19/548* (2013.01); *F16C 35/067* (2013.01); *F16C 41/04* (2013.01); *B60B 27/001* (2013.01); *B60B 2320/10* (2013.01); *B60B 2380/14* (2013.01); *B60B 2900/3314* (2013.01); *F16C 19/364* (2013.01); *F16C 2326/02* (2013.01)

(58) Field of Classification Search
 USPC ......................................................... 206/335
 See application file for complete search history.

(56) References Cited

U.S. PATENT DOCUMENTS

| | | | | |
|---|---|---|---|---|
| 5,456,379 | A * | 10/1995 | Krupa | B65D 43/162 206/508 |
| 5,878,881 | A * | 3/1999 | Hunt | A47L 13/51 220/571.1 |
| 6,170,663 | B1 * | 1/2001 | Glassman | B65D 75/32 206/461 |
| 6,464,077 | B1 * | 10/2002 | Liu | B65D 85/04 206/463 |
| 7,198,151 | B1 * | 4/2007 | Fomby | A45C 11/00 220/4.24 |
| 2007/0023303 | A1 * | 2/2007 | Templeton | F16C 41/04 206/318 |
| 2007/0228599 | A1 * | 10/2007 | Elkouh | B32B 1/00 442/76 |

FOREIGN PATENT DOCUMENTS

JP  2008169957 A  7/2008
KR  20140021426 A  2/2014

\* cited by examiner

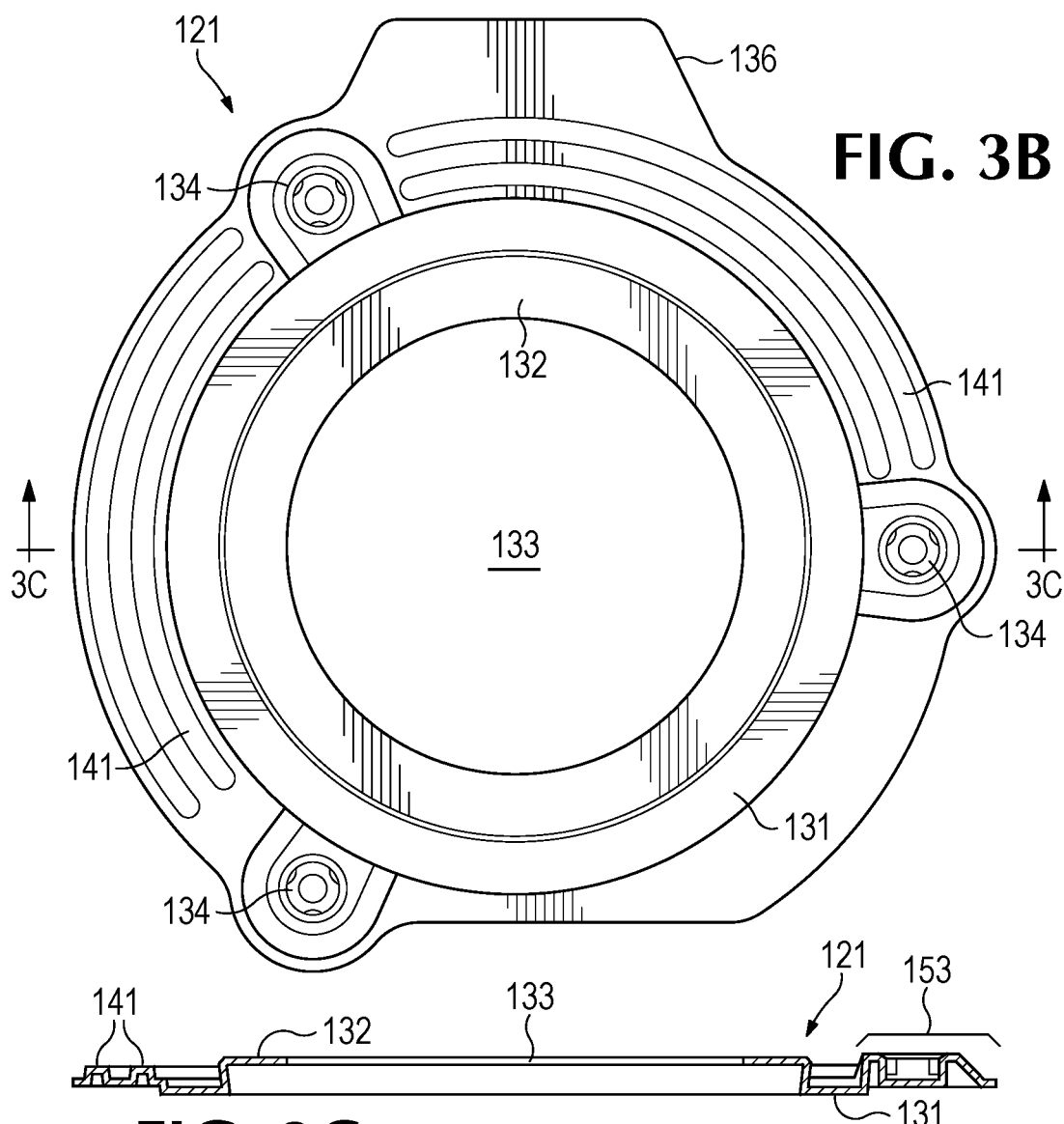

WHEEL HUB AND BEARING ASSEMBLY PACKAGING

CROSS-REFERENCES TO RELATED APPLICATIONS

This patent application is a divisional of application Ser. No. 15/820,780, filed Nov. 22, 2017, which claims the benefit of provisional Application No. 62/425,174 filed Nov. 22, 2016 and provisional Application No. 62/517,591 filed Jun. 9, 2017. Each of those applications is incorporated into this patent application by this reference.

FIELD OF THE INVENTION

This disclosure is directed to devices and methods for protecting and maintaining the proper alignment of bearing assemblies in a wheel hub.

BACKGROUND

Wheel hubs are mounted onto a vehicle and, along with the tires, are the vehicle's connection to the road. The wheel hubs are mounted onto driven or passive spindles to support the vehicle, allowing it to move about as we have all come to expect. Bearings are often inserted within the wheel hub to assist with rotation of the hub about the spindle onto which it is mounted.

Wheel hubs can be shipped to a user with the bearings pre-installed within the hub, allowing the user to simply install the wheel hub and bearing assembly onto a spindle. A critical aspect of installing the wheel hub and bearings onto the spindle is the proper alignment and spacing of the bearings within the wheel hub. Improper alignment and spacing can decrease the life of the bearings and the seal, necessitating early replacement of component. At the worst, the improper installation of the bearings and wheel hub can create a hazardous situation, endangering the vehicle operator and other road users.

For wheel hubs and bearing assemblies with pre-installed bearings, a supplier needs to ensure that the assembly is supplied to a user with the bearings properly installed and aligned. Even if aligned during manufacture, the bearings can become misaligned during transit or storage of a wheel hub and bearing assembly. If so, the user would need to take additional steps to properly install and align the bearings before installing the assembly onto a spindle.

BRIEF DESCRIPTION OF THE DRAWINGS

FIG. 3B is a top view of the outboard guard of FIG. 3A. FIG. 3C is a cross-section of the outboard guard of FIG. 3A. FIG. 3D is a bottom perspective view of the outboard guard of FIG. 3A.

DETAILED DESCRIPTION

As described herein, embodiments of the invention are directed to packaging for a wheel hub and bearing assembly to protect and maintain the proper alignment of the bearings. The packaging helps to prevent or reduce contamination, such as by dirt and debris, of the components of the wheel hub and bearing assembly. The packaging also guides a user to correctly install the wheel hub and bearing assembly onto a vehicle's spindle, and the packaging is easily removed by a user once the wheel hub and bearing assembly is installed on the spindle. Optionally, the packaging may also protect either or both of the wheel hub seal and the ABS tone ring.

Figure 1:
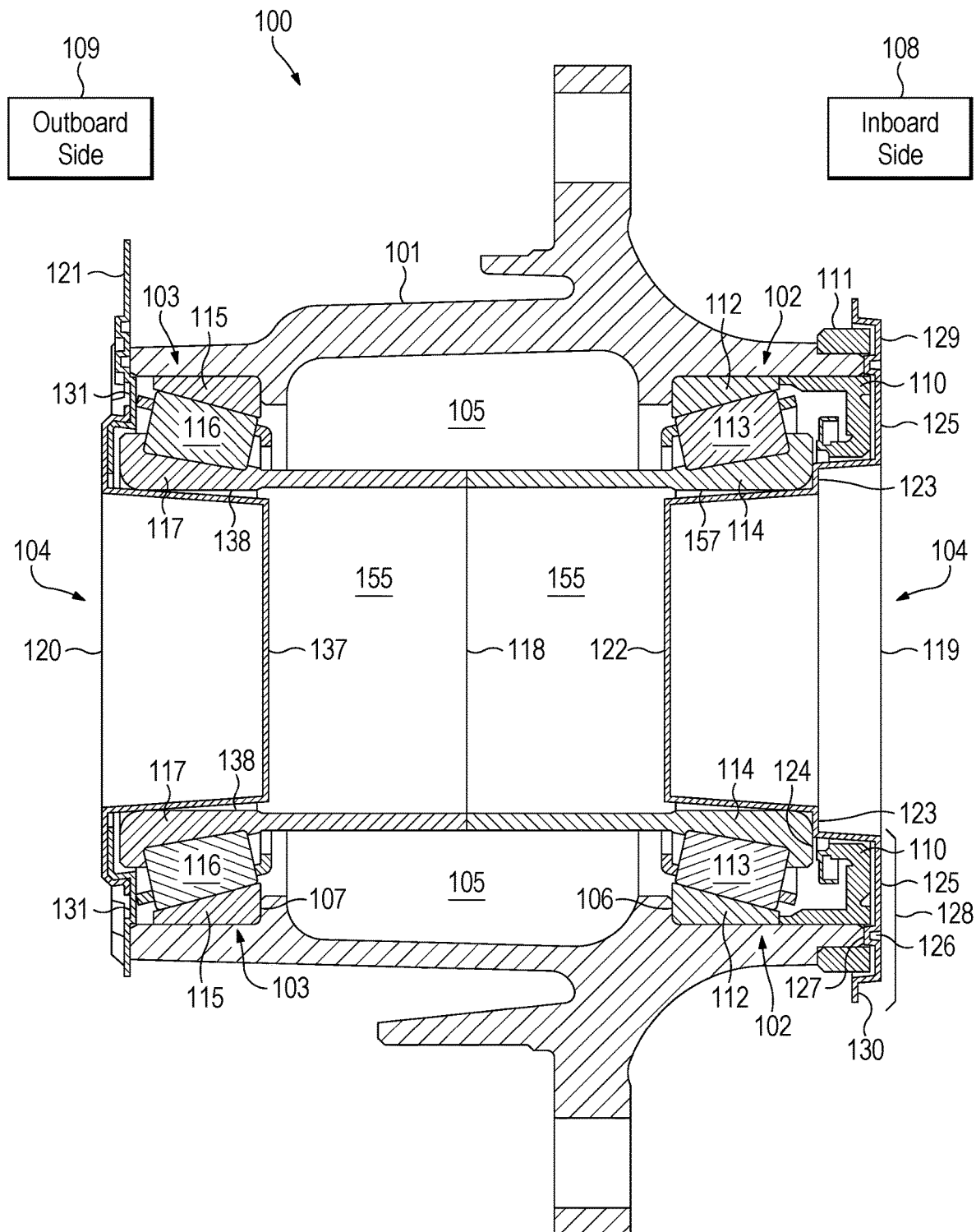
FIG. 1 is a cross-section of a wheel hub and bearing assembly having extended bearing cones, according to embodiments of the invention.

FIG. 1 is a cross-sectional view showing material portions of a wheel hub and bearing assembly 100, according to embodiments of the invention. As illustrated in FIG. 1, a wheel hub and bearing assembly 100 may include a wheel hub 101, inboard bearings 102, outboard bearings 103, and packaging 104.

The wheel hub 101 includes an interior space 105 between an inboard bearing land 106 and an outboard bearing land 107. The wheel hub and bearing assembly 100 may be mounted onto the vehicle's spindle, with the spindle passing from an inboard side 108 of the wheel hub 101, through a wheel hub bore 155 of the wheel hub 101 and extending through an outboard side 109 of the wheel hub 101. A wheel hub seal 110 is placed at the inboard side 108 of the wheel hub 101 to protect and retain lubricant within the wheel hub and bearing assembly 100. Additionally, the wheel hub 101 can include an optional ABS tone ring 111 disposed about the circumference of the wheel hub 101 on the inboard side 108.

The inboard bearing includes an inboard bearing cup 112, inboard bearing elements 113, and an inboard bearing cone 114. The inboard bearing cup 112 is inserted or press fitted into the inboard side 108 of the wheel hub 101, with the inboard bearing cup 112 resting against the inboard bearing land 106. The wheel hub seal 110 is inserted into the inboard side 108 of the wheel hub 101, against the inboard bearing cup 112.

The outboard bearing includes an outboard bearing cup 115, outboard bearing elements 116, and an outboard bearing cone 117. The outboard bearing cup 115 is inserted or press fitted into the outboard side 109 of the wheel hub 101, with the outboard bearing cup 115 resting against the outboard bearing land 107. The inboard bearing elements 113 and the outboard bearing elements 116 may be, for example, tapered roller bearings. The inboard bearing cone 114 and the outboard bearing cone 117 are extended and abut each other within the interior space 105 of the wheel hub 101 at a contact region 118. Examples of extended cones are given in Patent Application Publication No. US 2016/0236511. The extended cones eliminate the requirement of a separate spacer element, such as the spacer element 250 of FIG. 5.

The packaging 104 includes an inboard guard 119, or cap; an outboard retainer cap 120; and an outboard guard 121.

Figure 2A:
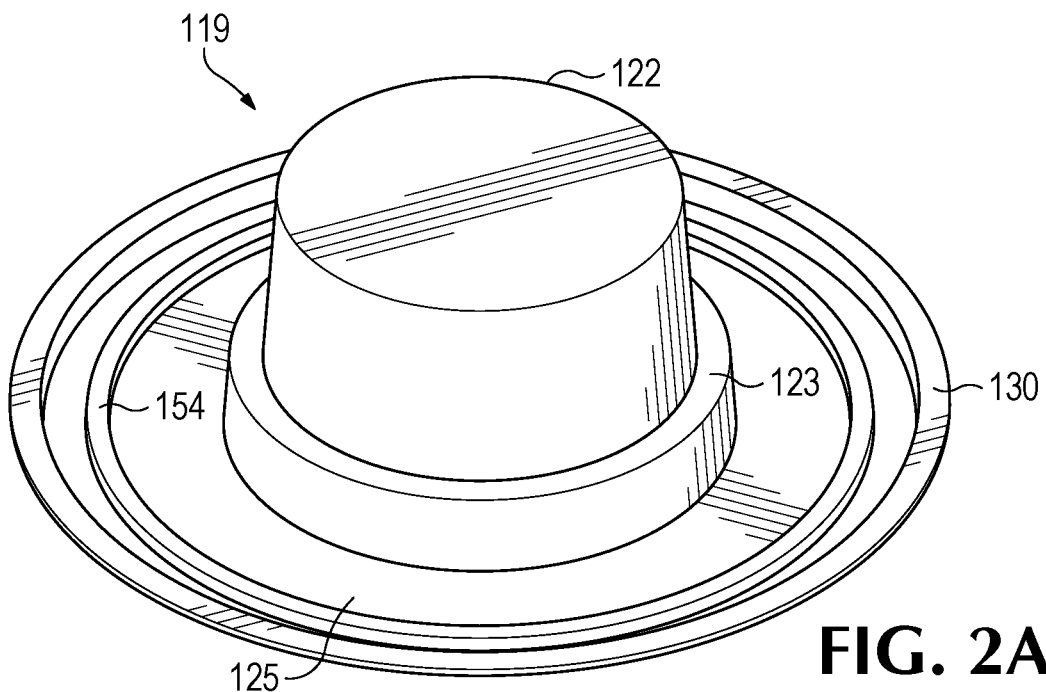
FIG. 2A is a top perspective view of the inboard guard or cap of FIG. 1.
Figure 2B:
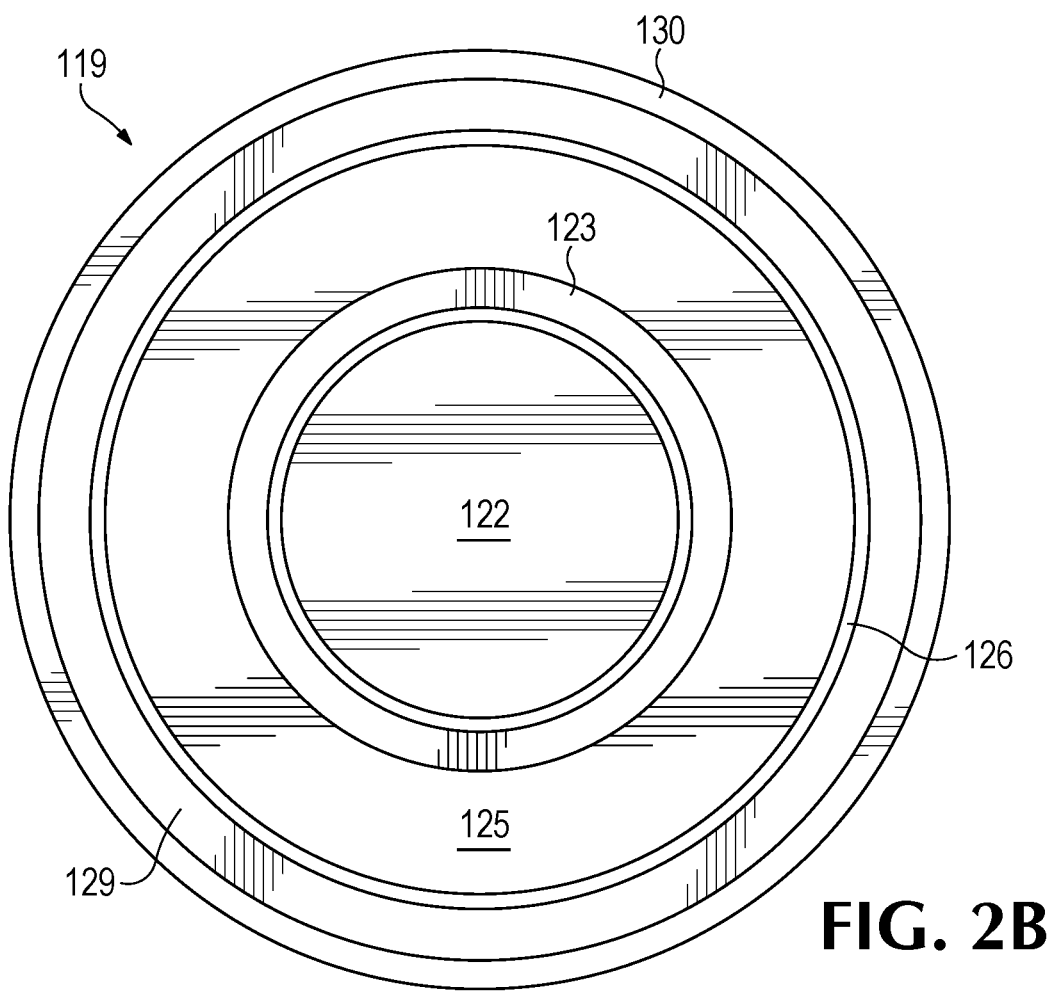
FIG. 2B is a top view of the inboard guard or cap of FIG. 2A.
Figure 2C:
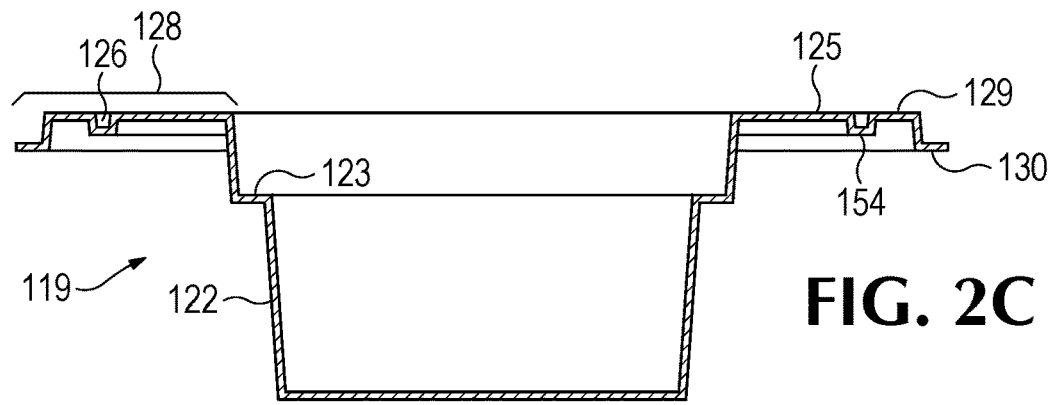
FIG. 2C is a cross-section of the inboard guard or cap of FIG. 2A.
Figure 2D:
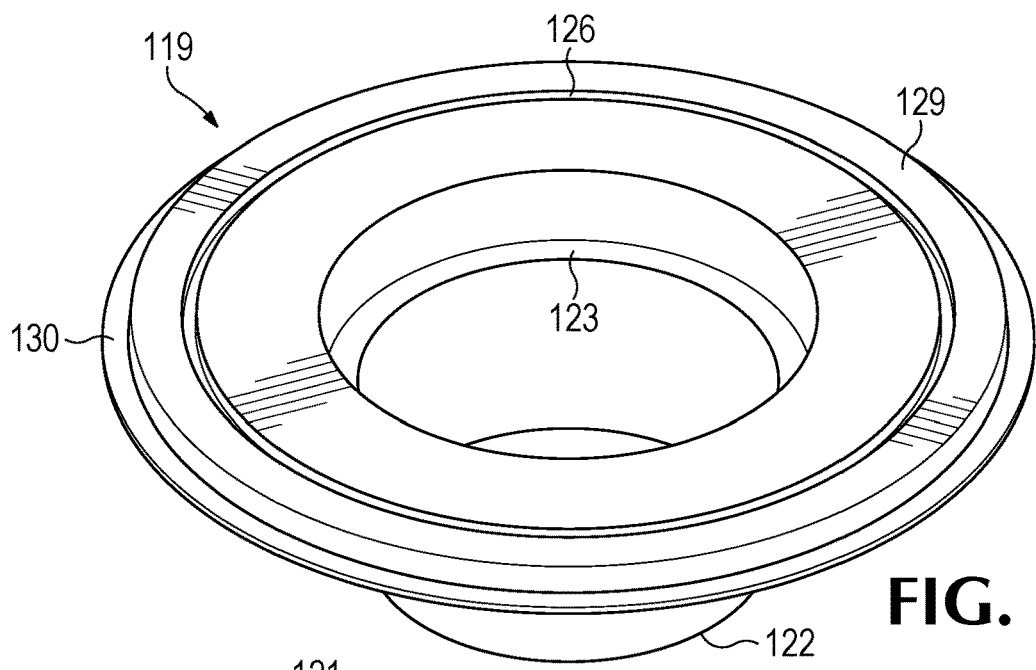
FIG. 2D is a bottom perspective view of the inboard guard or cap of FIG. 2A.

FIG. 2A is a top perspective view showing material portions of an inboard guard 119, according to embodiments of the invention. FIG. 2B is a top view of the inboard guard 119 of FIG. 2A, FIG. 2C is a cross-section of the inboard guard 119 of FIG. 2A, and FIG. 2D is a bottom perspective view of the inboard guard 119 of FIG. 2A.

As illustrated in FIGS. 2A-2D, the inboard guard 119 may include an inboard alignment protrusion 122 that contacts the inboard bearing cone 114, preferably at an inner surface 157, or inner diameter, (see FIG. 1) of the inboard bearing cone 114, to align and retain the inboard bearing cone 114 within the wheel hub 101. The inboard guard 119 also includes an annular shelf 123 that contacts a flat, annular surface 124 at the inboard end of the inboard bearing cone 114 to retain the inboard bearing cone 114 within the wheel hub 101.

A wheel hub seal protector 125 is a portion of an outer brim 128 of the inboard guard 119. The wheel hub seal protector 125 prevents damage to the wheel hub seal 110 and also prevents external influences from altering the position of the wheel hub seal 110 within the wheel hub 101. The wheel hub seal 110 and the wheel hub seal protector 125 are separated a distance such that, when the wheel hub and bearing assembly 100, including the inboard guard 119, are placed inboard-side down on a surface, the wheel hub seal 110 and the wheel hub seal protector 125 do not contact each other. This relationship or spacing prevents the wheel hub seal 110 from being pushed in or misaligned within the wheel hub 101 when the assembly is stored with the inboard-side down. Rather, loads from the assembly are channeled by the inboard guard 119 to the flat, annular surface 124 of the inboard bearing cone 114 through the annular shelf 123 and are also channeled into the wheel hub 101 by a channel 126 on the outer brim 128 of the inboard guard 119. When placed in an inboard-side down orientation, the wheel hub seal 110 of the wheel hub and bearing assembly 100 is protected from damage and misalignment.

As illustrated in FIGS. 2A-2D, the channel 126 is formed by a ridge 154 that is raised axially from the outer brim 128 in the outboard direction. The channel 126 of the inboard guard 119 contacts an inboard surface 127 of the wheel hub 101. The depth of the channel 126, which is equivalent to the distance the outer brim 128 of inboard guard 119 is positioned away from the inboard surface 127 of wheel hub 101, can be used as a reference for various other dimensions of the inboard guard 119. For example, the depth of the channel 126 can be used as a reference for the depth at which the annular shelf 123 is positioned, which is the depth to which the inboard bearing cone 114 is restrained.

The optional ABS tone ring 111 can be included with the wheel hub and bearing assembly 100. The inboard guard 119 can include an ABS tone ring protector 129 to protect the ABS tone ring 111 from damage, such as crush damage, cuts, nicks, etc., during transit and storage of the wheel hub and bearing assembly 100 prior to installation onto a spindle. The ABS tone ring protector 129 is a portion of an outer brim 128 of inboard guard 119.

A flange 130 is included about the periphery of the inboard guard 119. The user may grasp the flange 130 to remove the inboard guard 119 from the wheel hub and bearing assembly 100 before installation of the assembly onto a spindle. For example, the flange 130 may be configured to allow the user to pinch the flange 130 between the user's fingers.

The inboard guard 119 may be retained in the inboard side 108 of the wheel hub and bearing assembly 100 by an interference fit between the inboard guard 119 and the inboard bearing and between the inboard guard 119 and the wheel hub 101. As used in this document, an interference fit means that two parts are fastened and held together by friction after the two parts are pushed together, rather than by other means of fastening such as by threading one part into another part. The inboard guard 119 can be constructed of a durable, semi-compliant material that can withstand an amount of deformation required to retain the inboard guard 119 securely within the wheel hub and bearing assembly 100. Preferably, the material of the inboard guard 119 is durable to protect the inboard bearing, the wheel hub seal 110, and the ABS tone ring 111 from damage and also to withstand the crush forces imparted when the wheel hub and bearing assembly 100 is stored inboard-side down.

The outboard retainer cap 120 and the outboard guard 121 are affixed to the outboard side 109 of the wheel hub 101 to protect and align the outboard bearing and protect the interior of the wheel hub and bearing assembly 100 from damage. Preferably, the outboard retainer cap 120 is removably affixed to, such as by snapping into through an interference fit, the outboard guard 121, while the outboard guard 121 is removably affixed to the wheel hub 101 as discussed below.

Figure 3A:
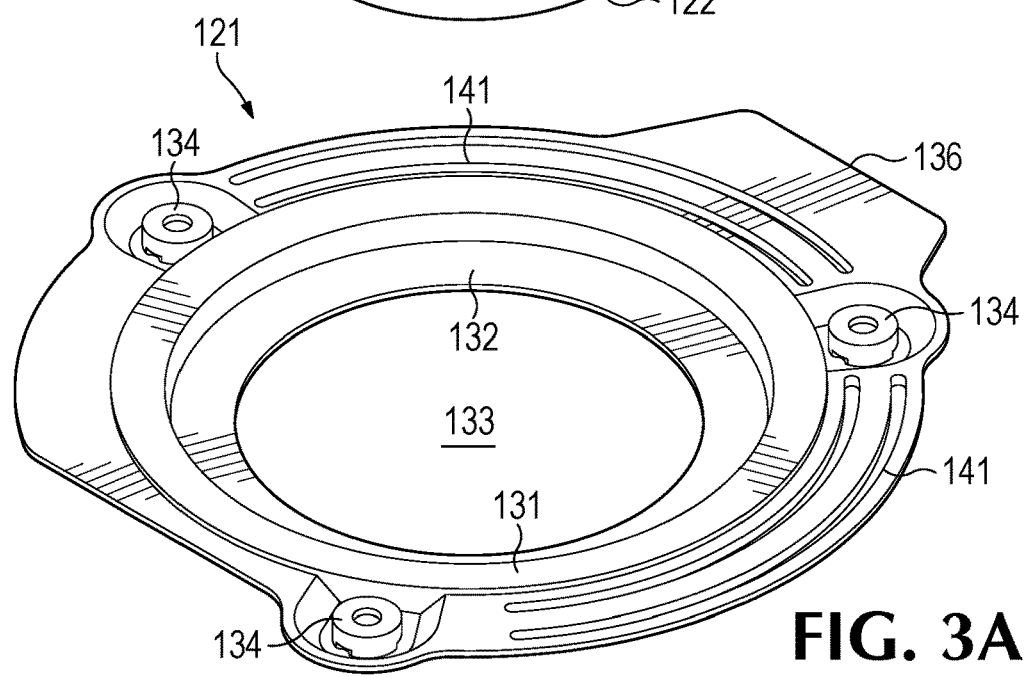
FIG. 3A is a top perspective view of the outboard guard of FIG. 1.

FIG. 3A is a top perspective view showing material portions of an outboard guard 121, according to embodiments of the invention. FIG. 3B is a top view of the outboard guard 121 of FIG. 3A, FIG. 3C is a cross-section of the outboard guard 121 or cap of FIG. 3A, and FIG. 3D is a bottom perspective view of the outboard guard 121 or cap of FIG. 3A. As shown in FIG. 3B, the outboard guard 121 may have a substantially circular planform.

As illustrated in FIGS. 3A-3D, the outboard guard 121 may include an outboard bearing protector portion 131, an engagement portion 132, an outboard guard opening 133, and retainer clips 134. An outer rim 153 surrounds the outboard bearing protector portion 131.

The outboard bearing protector portion 131 protects the outboard bearing from damage. The outboard guard engagement portion 132 and the outboard bearing protector portion 131 together serve to retain the outboard bearing within the wheel hub 101 and to provide an engagement between the outboard retainer cap 120 and the outboard guard 121, to securely restrain the outboard guard 121 to the outboard retainer cap 120 with an interference fit.

One or more stiffening ribs 141 may extend about the outboard guard 121, preferably about the outer rim 153. For example, two pairs of arcuate stiffening ribs 141 may partially encircle the outboard guard opening 133, such as shown in FIGS. 3A-3D.

The outboard guard 121 may be affixed to the outboard side 109 of the wheel hub 101 by the retainer clips 134, which pass into hubcap mounting holes 135 of the wheel hub 101. The retainer clips 134, which are preferably within the outer rim 153 of the outboard guard 121, form an interference fit with the hubcap mounting holes 135 to securely restrain the outboard guard 121 to the wheel hub 101. The outboard guard 121 further includes a pull tab 136 to disengage and remove the retainer clips 134 from the wheel hub 101, which also removes the outboard guard 121 from the wheel hub 101. For example, a user might pinch the pull tab 136 between the user's thumb and index finger or otherwise grasp the pull tab 136 of the outboard guard 121. Preferably, the pull tab 136 extends radially from the outer rim 153 of the outboard guard 121.

Preferably, the retainer clips 134 and the outboard guard 121 function as a single element that a user can remove in one piece from the wheel hub and bearing assembly 100 during the installation process. This preferred design reduces or eliminates the possibility of one or more of the retainer clips from becoming disengaged from the outboard guard 121 during the removal process. Otherwise, once disengaged, the separated retainer clips might disperse, potentially contaminating the installation area or causing an untidy or unsafe environment for the user. Even so, in some embodiments the retainer clips 134 and the outboard guard 121 do not function as a single element.

As an example of the retainer clips 134 and the outboard guard 121 functioning as a single element, the retainer clips 134 can be integrated with the outboard guard 121. That is, the retainer clips 134 can be formed integral to the outboard guard 121. Thus, the outboard guard 121 and retainer clips 134 may be formed, such as by molding, as a single unit. An example of this is shown in FIGS. 3A-3D.

Another method of integrating the retainer clips 134 with the outboard guard 121 includes affixing the otherwise separable retainer clips 134 to the outboard guard 121 so that the two elements are not separated when the outboard guard 121 is removed from the wheel hub and bearing assembly 100. In contrast to what is shown FIGS. 3A-3D, in versions having separable retainer clips 134, the outboard guard 121 may have a retainer clip opening, or through hole, instead of the integrated retainer clips 134 shown in FIGS. 3A-3D. For example, there may be one retainer clip opening where each integrated retainer clip is shown in FIGS. 3A-3D. Example methods of affixing the otherwise separable retainer clips 134 to the outboard guard 121 include using an adhesive to bond the two elements together, fusing the two elements together using a thermal or chemical process, tethering the two elements together using a mechanical process, and constructing the retainer clips 134 and/or the outboard guard 121 to include a structural element(s) that causes the two elements to engage together and prevents their separation. Example structural elements can include unidirectional locking elements that allow the retainer clips 134 to be inserted through the retainer clip openings of the outboard guard 121, but prevents their retraction from the outboard guard 121 once inserted through the retainer clip openings. In an example embodiment, rear-facing barbs can be included on the retainer clips 134, allowing them to be inserted through the outboard guard 121 and into the hubcap mounting holes 135 of the wheel hub 101. The rear-facing barbed portions of the retainer clips 134 prevent the retainer clips 134 from disengaging from the outboard guard 121 when the outboard guard 121 and retainer clips 134 are removed from the wheel hub and bearing assembly 100.

Whether integrated, affixed, or separable, each of the retainer clips 134 may be a plug, pin, threaded fastener, or some other mechanism for affixing the outboard guard 121 to the outboard side 109 of the wheel hub 101. For example, one or more of the retainer clips 134 may be a screw made of a synthetic polymer, such as nylon.

Figure 4A:
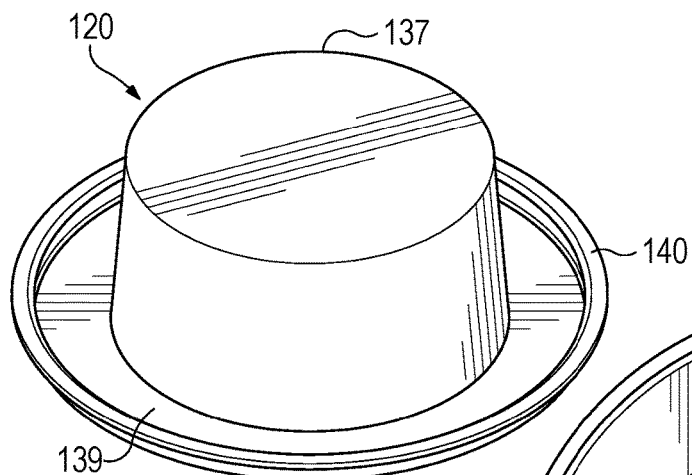
FIG. 4A is a top perspective view of the outboard retainer cap of FIG. 1.
Figure 4B:
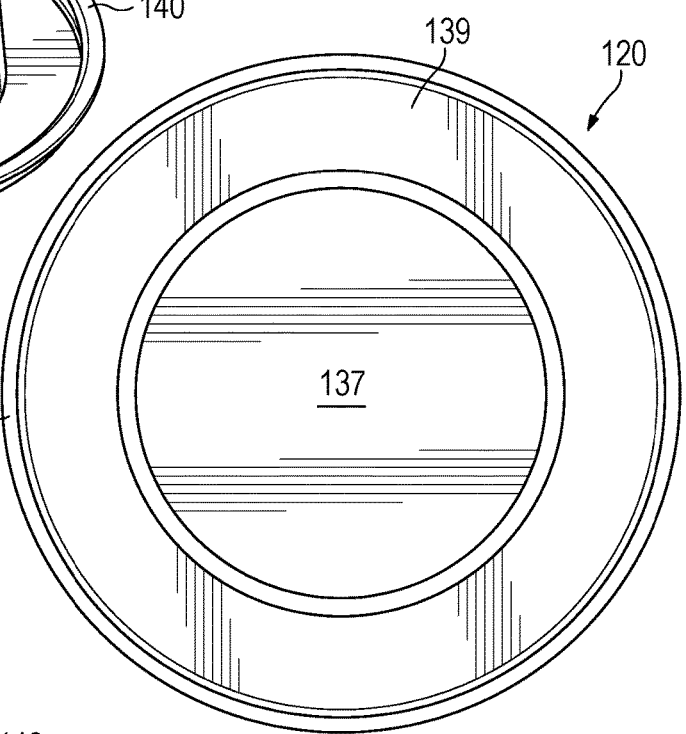
FIG. 4B is a top view of the outboard retainer cap of FIG. 4A.
Figure 4C:
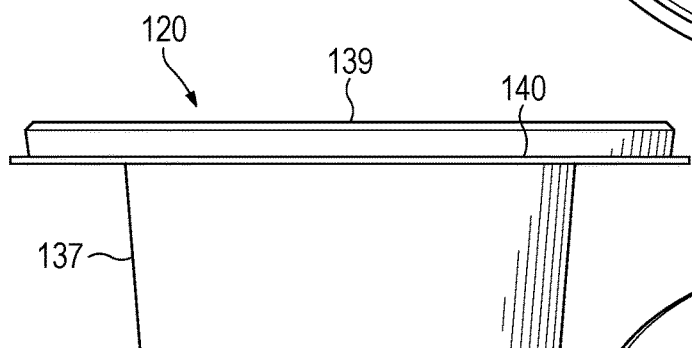
FIG. 4C is a side view of the outboard retainer cap of FIG. 4A.
Figure 4D:
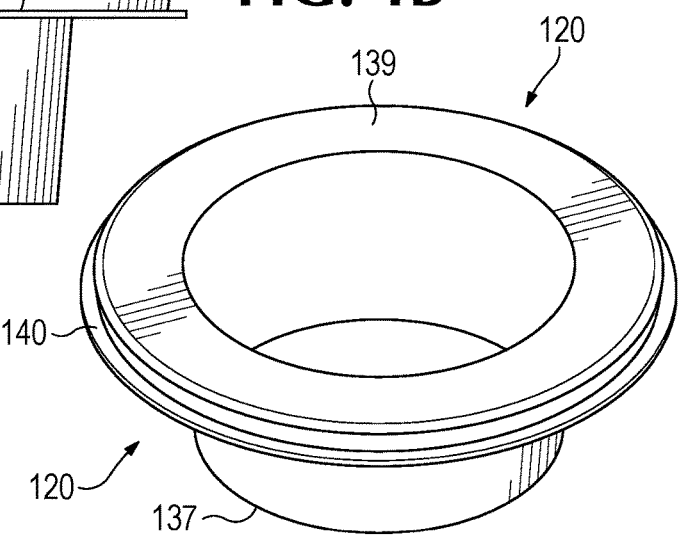
FIG. 4D is a bottom perspective view of the outboard retainer cap of FIG. 4A.

FIG. 4A is a top perspective view showing material portions of an outboard retainer cap 120, according to embodiments of the invention. FIG. 4B is a top view of the outboard retainer cap 120 of FIG. 4A, FIG. 4C is a side view of the outboard retainer cap 120 of FIG. 4A, and FIG. 4D is a bottom perspective view of the outboard retainer cap 120 of FIG. 4A.

The outboard retainer cap 120 includes an outboard alignment protrusion 137 that contacts an inner surface 138, or inner diameter, (see FIG. 1) of the outboard bearing cone 117. The outboard alignment protrusion 137 aligns the outboard bearing within the wheel hub 101.

The outboard guard 121 engages the outboard retainer cap 120 to secure the outboard retainer cap 120 to the wheel hub and bearing assembly 100. The outboard retainer cap 120 is inserted through the outboard guard opening 133 and is removably secured to the outboard guard 121 by, for example, snap fitting a portion of the outboard retainer cap 120 together with a portion of the outboard guard 121 through an interference fit. For example, the outboard bearing protector portion 131 and the engagement portion 132 of the outboard guard 121 may engage with an engagement portion 139 of the outboard retainer cap 120 and a retaining flange 140 of the outboard retainer cap 120. Accordingly, the outboard guard 121 and the outboard retainer cap 120 preferably are each made of a semi-compliant material to allow the outboard retainer cap 120 to form an interference-type fit with the outboard guard 121.

Figure 5:
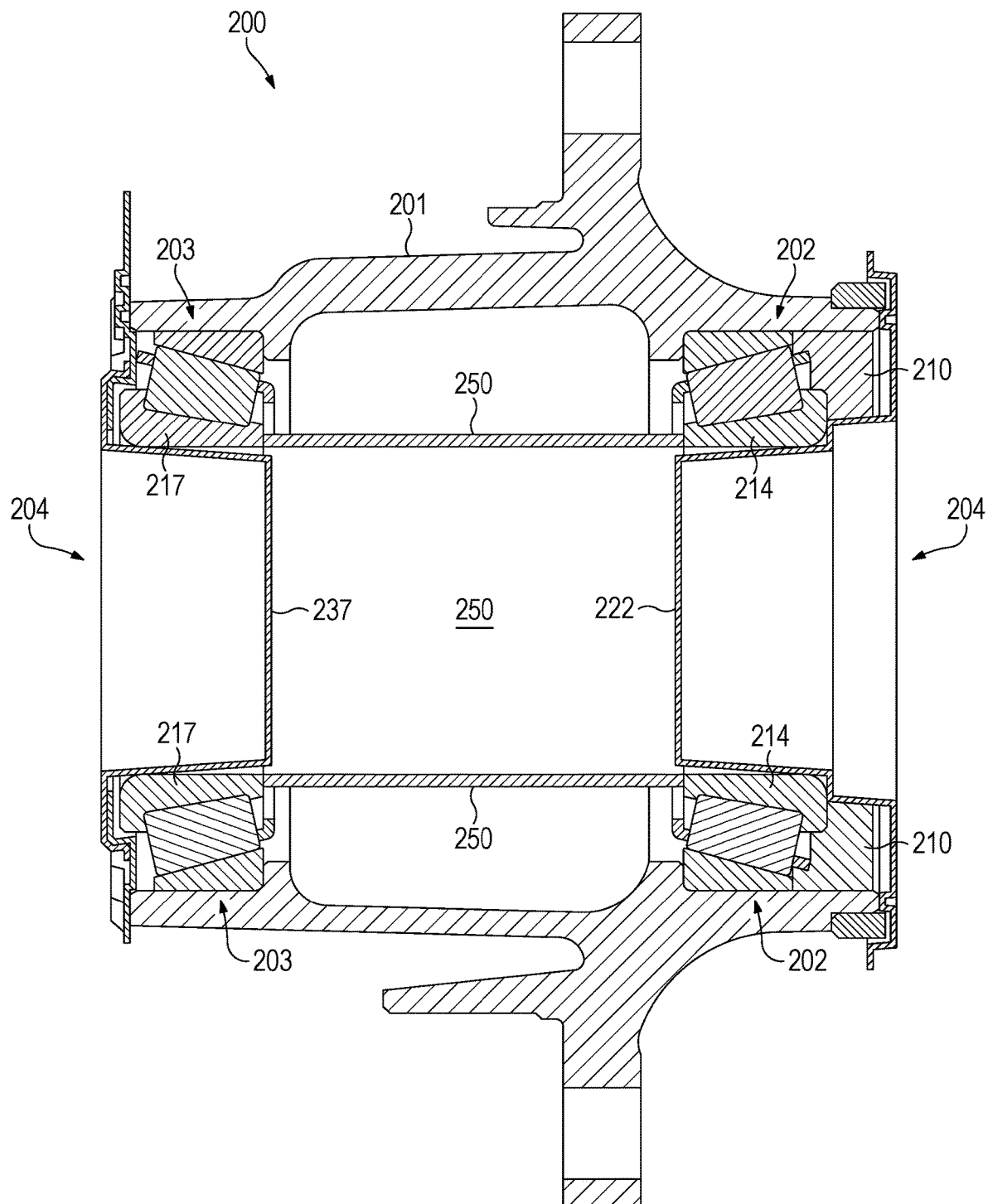
FIG. 5 is a cross-section of a wheel hub and bearing assembly having a spacer, according to embodiments of the invention.

FIG. 5 is a cross-sectional view showing material portions of a wheel hub and bearing assembly 200, according to embodiments of the invention. As illustrated in FIG. 5, a wheel hub and bearing assembly 200 may include a wheel hub 201, inboard bearings 202, outboard bearings 203, and packaging 204. The wheel hub 201, inboard bearings 202, outboard bearings 203, and packaging 204 are generally as described above for the respective items of FIG. 1, except that the inboard bearings 202 and the outboard bearings 203 of FIG. 5 do not have the extended cones of the inboard bearings 102 and the outboard bearings 103 of FIG. 1. Instead, the wheel hub and bearing assembly 200 includes a spacer element 250.

The spacer element 250 may be placed between the inboard bearing cone 214 and the outboard bearing cone 217. The spacer element 250 aligns and properly spaces the inboard bearing cone 214 and the outboard bearing cone 217.

Figure 6:
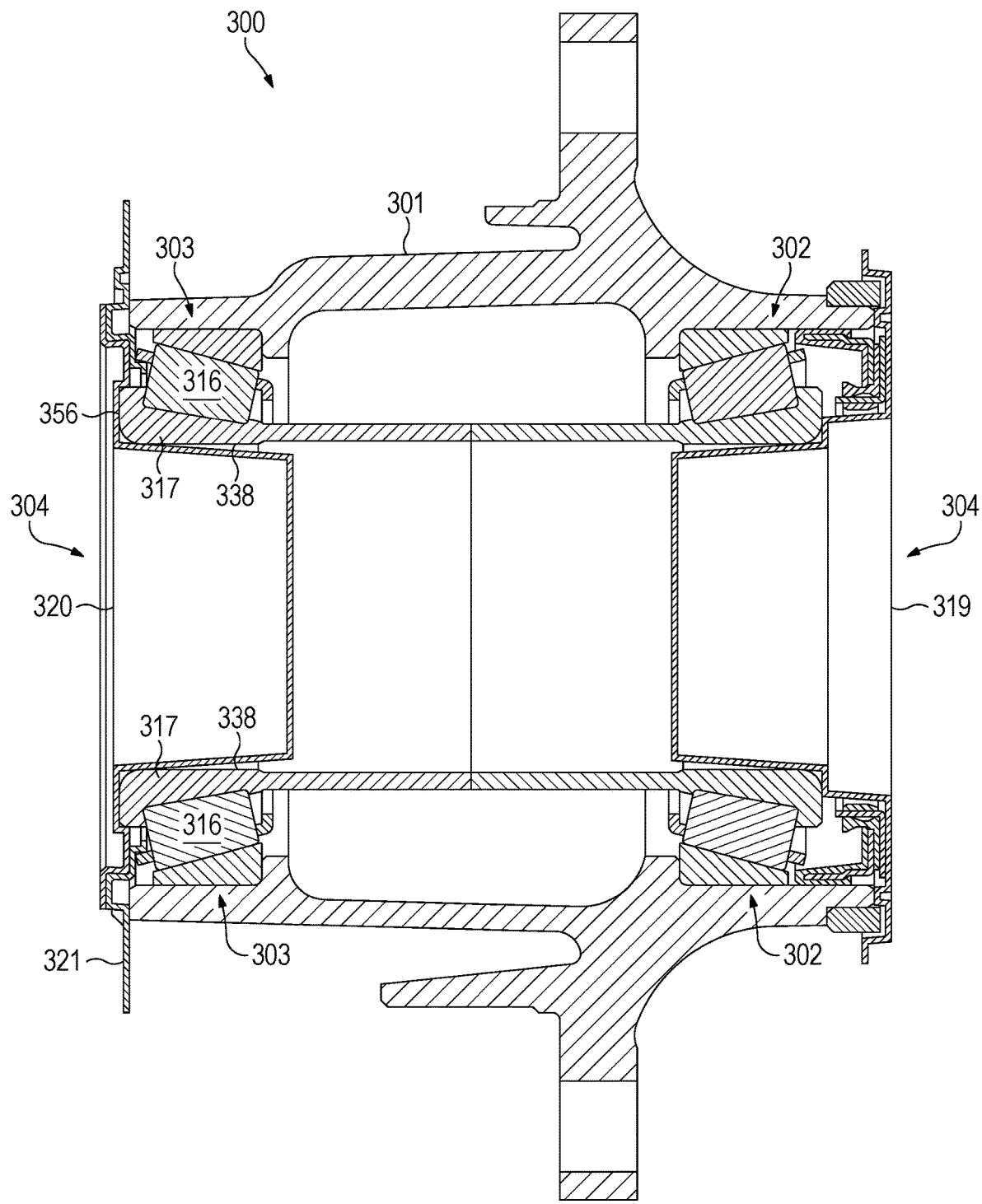
FIG. 6 is a cross-section of a wheel hub and bearing assembly having extended bearing cones, according to embodiments of the invention.
Figure 7:
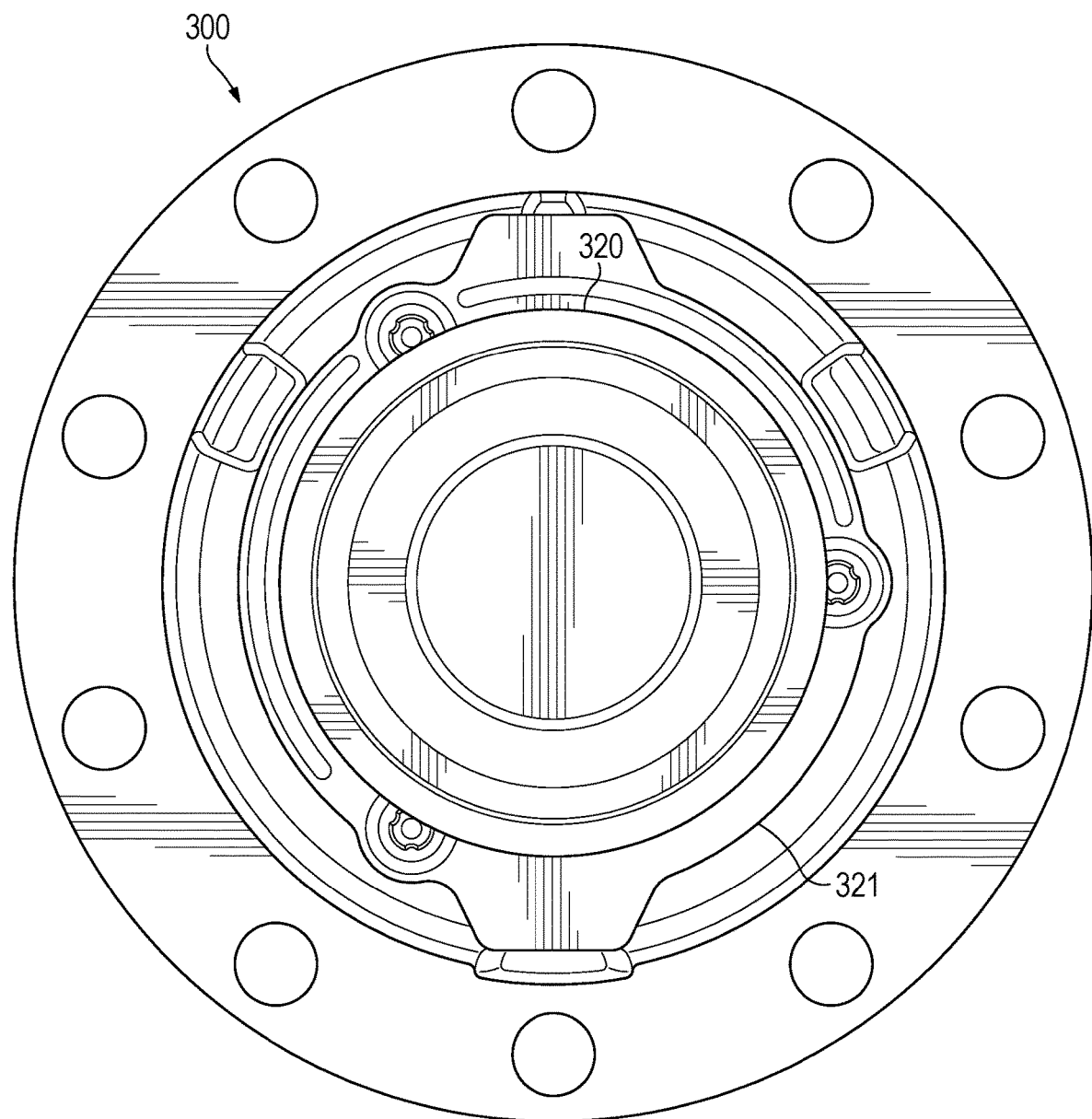
FIG. 7 is an outboard side view of the wheel hub and bearing assembly of FIG. 6.
Figure 8:
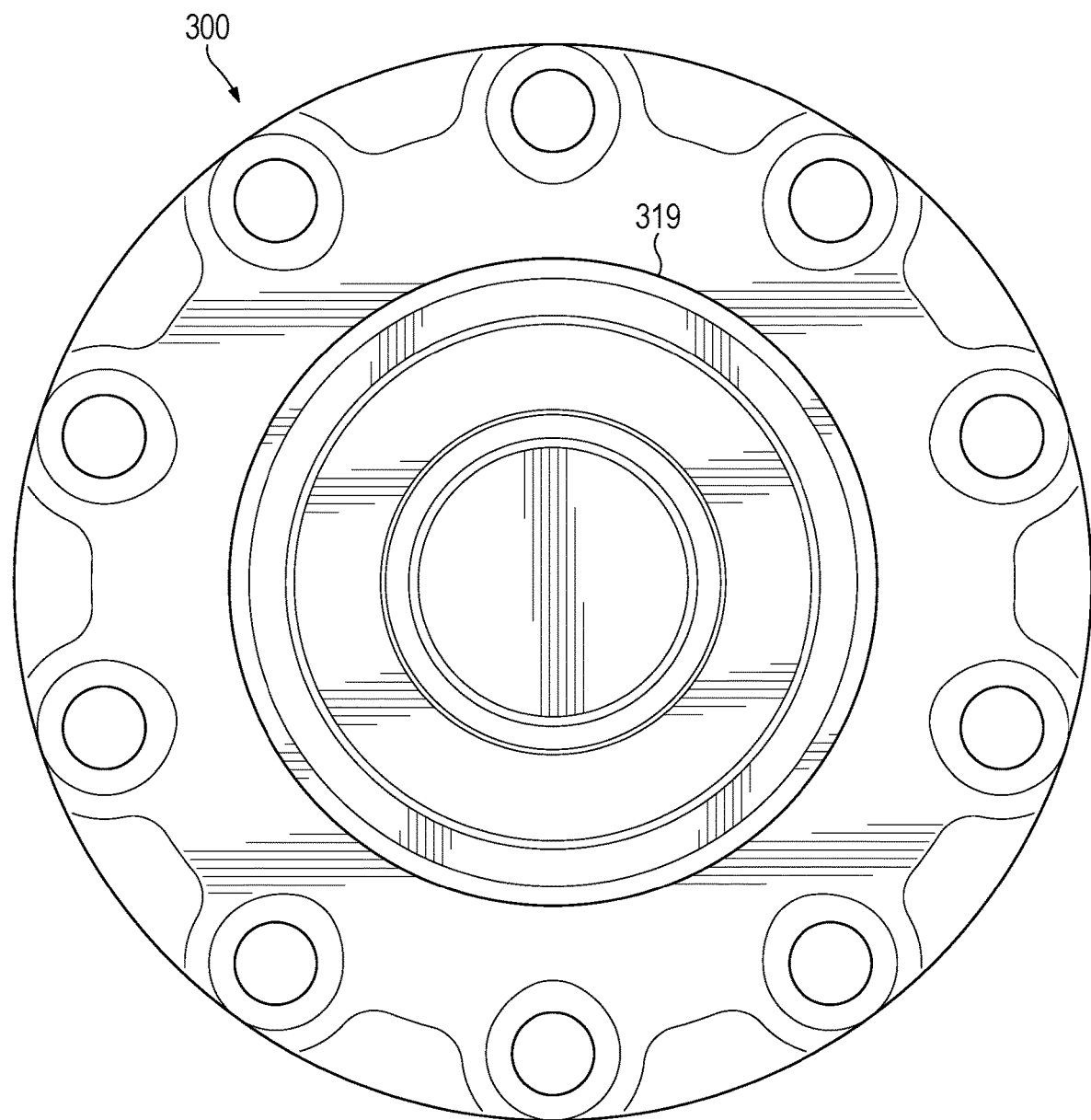
FIG. 8 is an inboard side view of the wheel hub and bearing assembly of FIG. 6.

FIG. 6 is a cross-sectional view showing material portions of a wheel hub and bearing assembly 300, according to embodiments of the invention. FIG. 7 is an outboard side view of the wheel hub and bearing assembly of FIG. 6. And FIG. 8 is an inboard side view of the wheel hub and bearing assembly of FIG. 6. As illustrated in FIGS. 6-8, a wheel hub and bearing assembly 300 may include a wheel hub 301, inboard bearings 302, outboard bearings 303, and packaging 304. The wheel hub 301, inboard bearings 302, and outboard bearings 303 are generally as described above for the respective items of FIG. 1.

The packaging 304 includes an inboard guard 319, or cap; an outboard retainer cap 320; and an outboard guard 321. The inboard guard 319 is as described above for the inboard guard 119 of FIG. 1.

Figure 9A:
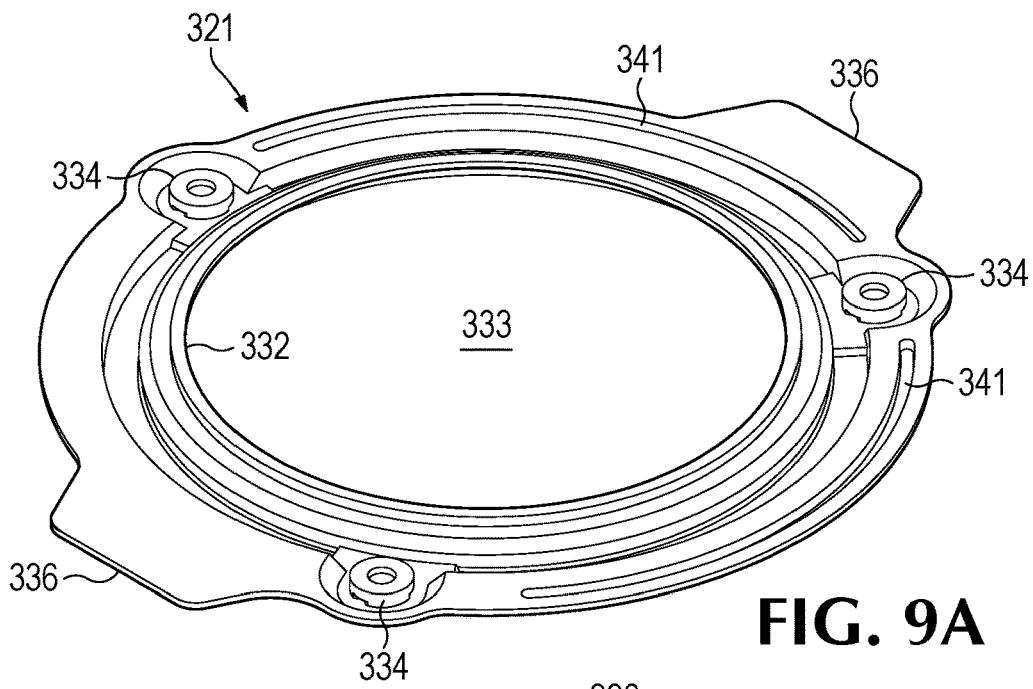
FIG. 9A is a top perspective view of the outboard guard of FIG. 6.
Figure 9B:
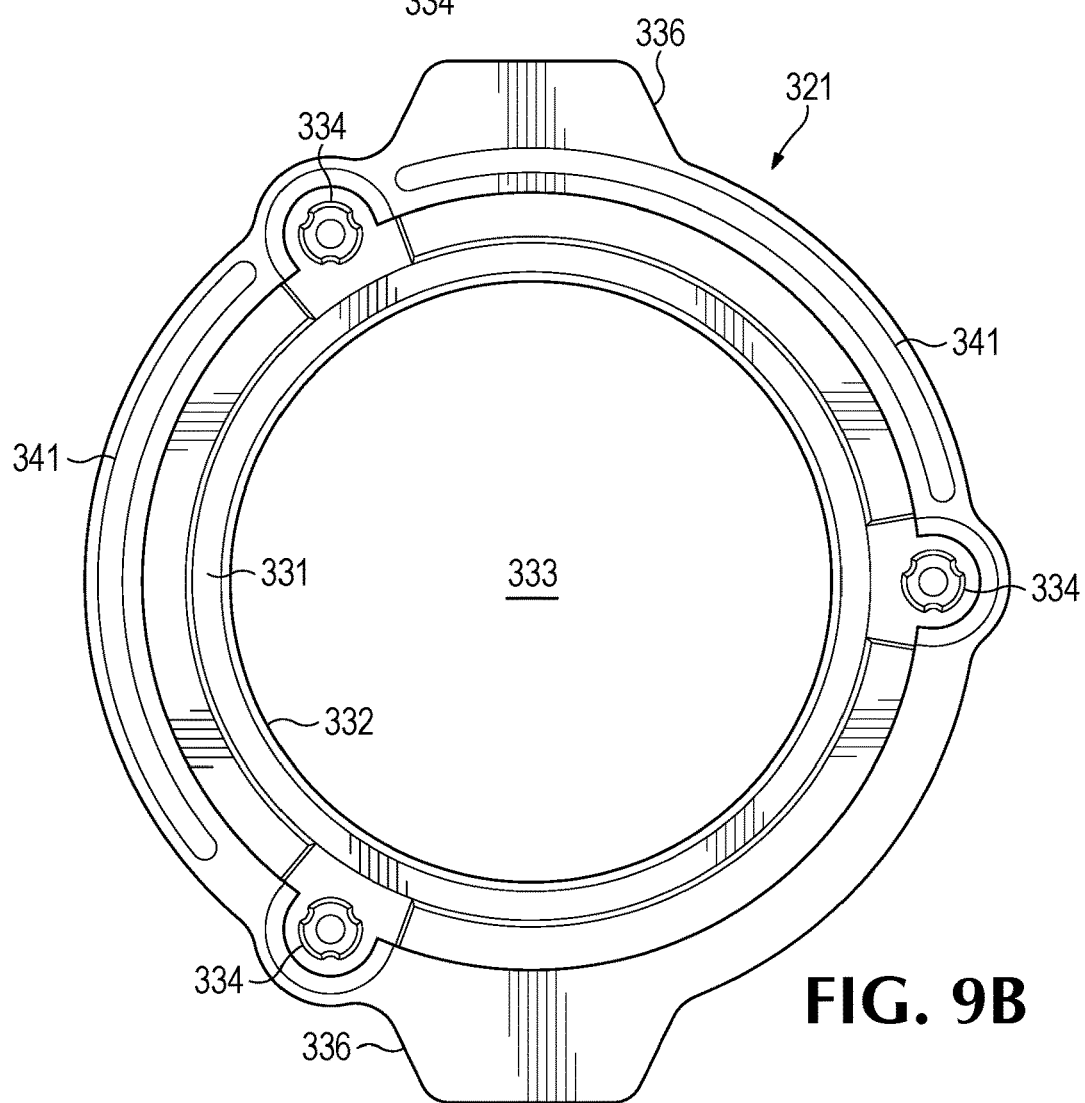
FIG. 9B is a top view of the outboard guard of FIG. 9A.
Figure 9C:
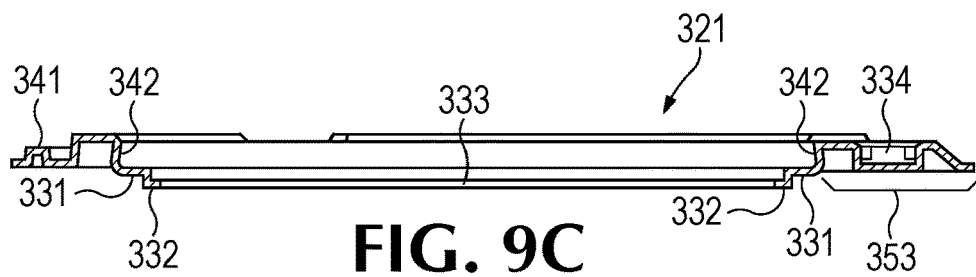
FIG. 9C is a cross-section of the outboard guard of FIG. 9A.
Figure 9D:
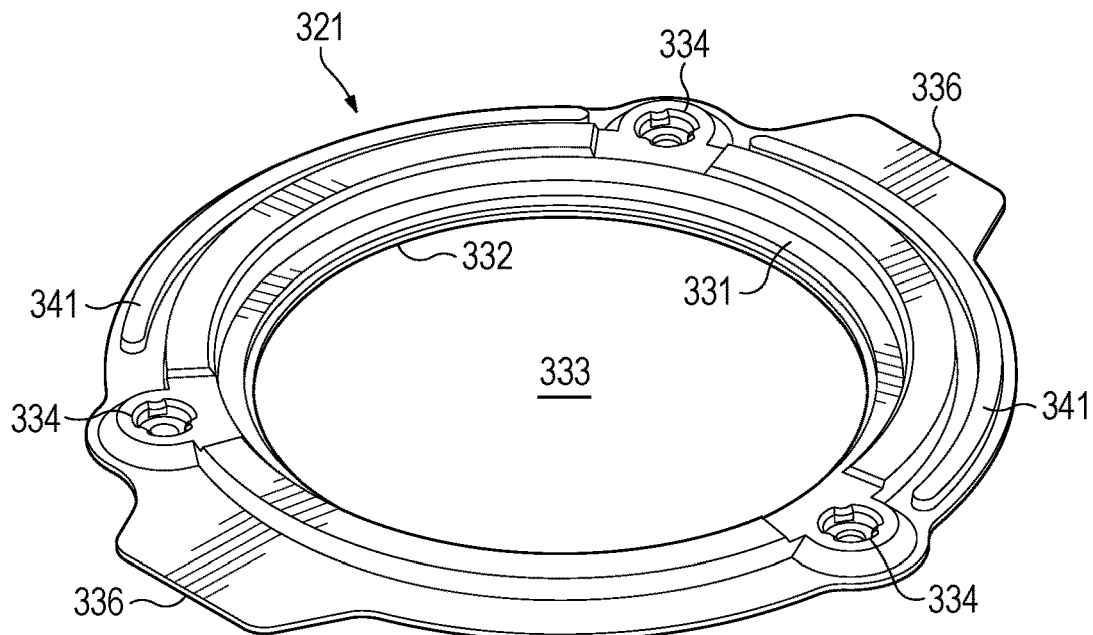
FIG. 9D is a bottom perspective view of the outboard guard of FIG. 9A.

FIG. 9A is a top perspective view showing material portions of an outboard guard 321, or cap, according to embodiments of the invention. FIG. 9B is a top view of the outboard guard 321 of FIG. 9A, FIG. 9C is a cross-section of the outboard guard 321 of FIG. 9A, and FIG. 9D is a bottom perspective view of the outboard guard 321 of FIG. 9A.

As illustrated in FIGS. 9A-3D, the outboard guard 321 may include an outboard bearing protector portion 331, an engagement portion 332, an outboard guard opening 333, and retainer clips 334. An outer rim 353 surrounds the outboard bearing protector portion 331. The outboard bearing protector portion 331 protects the outboard bearing from damage. The outboard guard engagement portion 332 and the outboard bearing protector portion 331 together serve to retain the outboard bearing within the wheel hub 301.

One or more stiffening ribs 341 may extend about the outboard guard 321, preferably about the outer rim 353. For example, stiffening ribs 341 may partially encircle the outboard guard opening 333, such as shown in FIGS. 9A-9D.

The outboard guard 321 may be affixed to the outboard side of the wheel hub 301 by the retainer clips 334 The outboard guard 321 includes one or more pull tabs 336 to disengage and remove the retainer clips 334 from the wheel hub 301, which also removes the outboard guard 321 from the wheel hub 301. For example, a user might pinch one of the pull tabs 336 between the user's thumb and index finger or otherwise grasp one or more of the pull tabs 336 of the outboard guard 321. Preferably, the pull tab 336 extends radially from the outer rim 353 of the outboard guard 321. The retainer clips 334 of FIGS. 9A-9D, which are preferably within the outer rim 353 of the outboard guard 321, are as described above for the retainer clips 134 of FIGS. 3A-3D.

The outboard guard 321 of FIGS. 9A-9D generally differs from the outboard guard 121 of FIGS. 3A-3D in that the diameter of the outboard guard opening 333 is generally larger than the diameter of the outboard guard opening 133. Specifically, the diameter of the outboard guard opening 333 is configured to be large enough to allow a typical spindle nut to be seated against the outboard bearings 303 within the diameter of the outboard guard opening 333. Thus, the outboard guard 321 may be removed from the wheel hub 301 after the spindle nut is either hand-tightened or fully torqued onto the spindle and against the outboard bearings 303. Accordingly, the outboard guard 321 may keep the outboard bearings 303 in place until the spindle nut is fully installed, at which time the outboard guard 321 may be removed from the wheel hub 301.

Figure 10A:
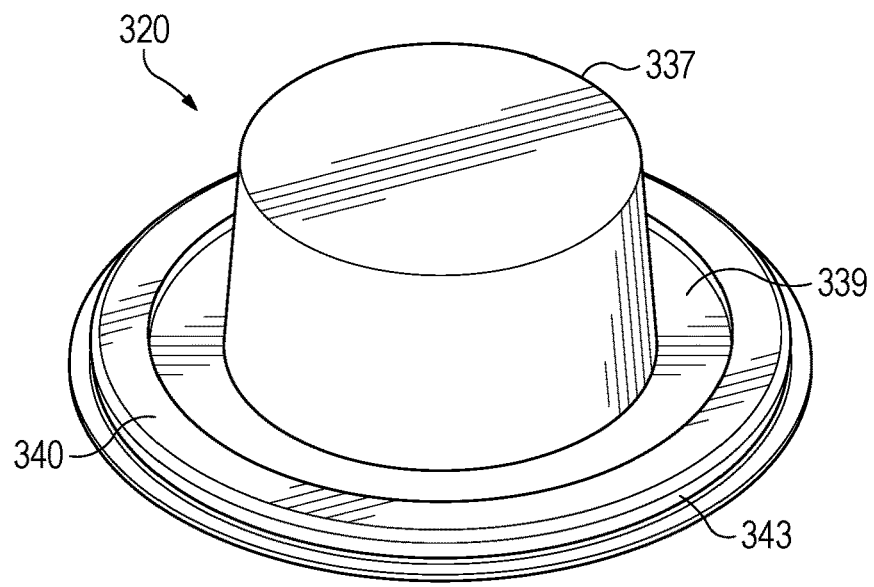
FIG. 10A is a top perspective view of the outboard retainer cap of FIG. 6.
Figure 10B:
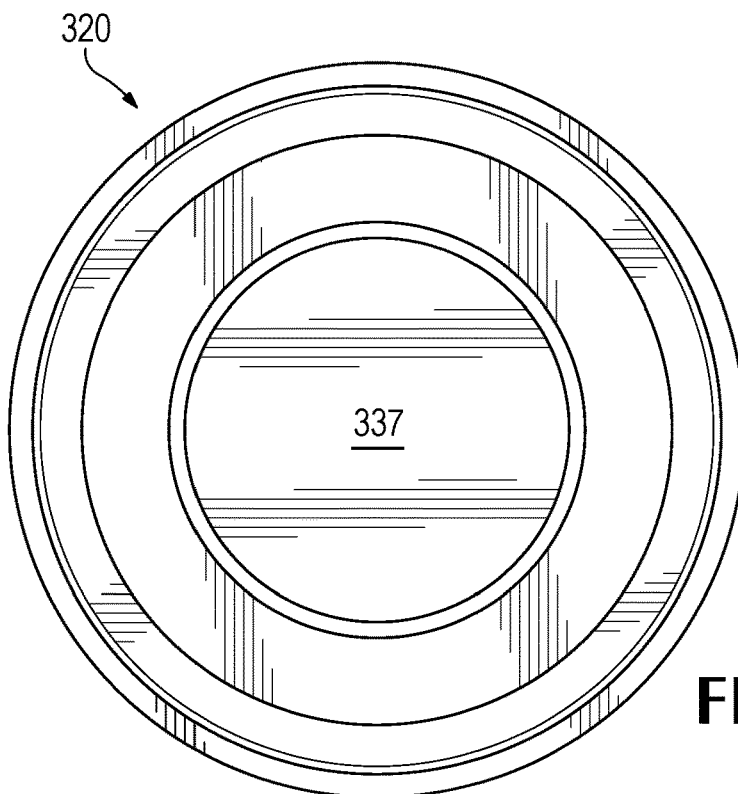
FIG. 10B is a top view of the outboard retainer cap of FIG. 10A.
Figure 10C:
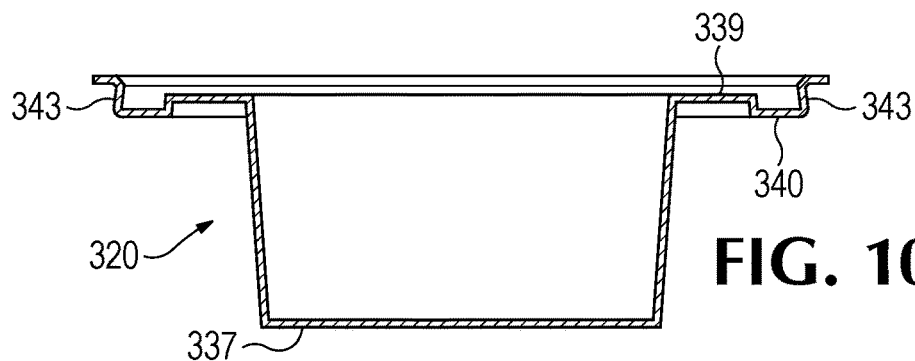
FIG. 10C is a cross-section of the outboard retainer cap of FIG. 10A.
Figure 10D:
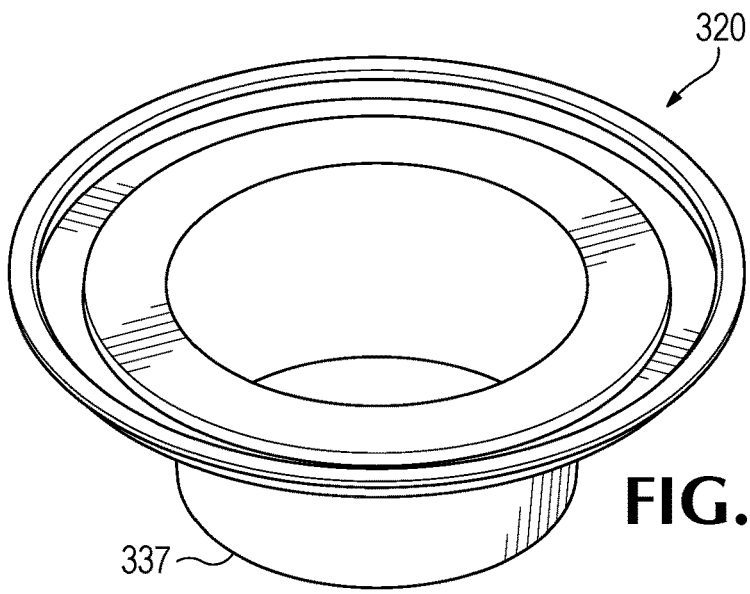
FIG. 10D is a bottom perspective view of the outboard retainer cap of FIG. 10A.

FIG. 10A is a top perspective view showing material portions of an outboard retainer cap 320, according to embodiments of the invention. FIG. 10B is a top view of the outboard retainer cap 320 of FIG. 10A, FIG. 10C is a cross-section of the outboard retainer cap 320 of FIG. 10A, and FIG. 10D is a bottom perspective view of the outboard retainer cap 320 of FIG. 10A.

The outboard retainer cap 320 includes an outboard alignment protrusion 337 that contacts an inner surface 338 (see FIG. 6) of the outboard bearing cone 317. The outboard retainer cap 320 preferably also contacts an outboard end 356 of the outboard bearing cone 317. The outboard retainer cap 320, and particularly the outboard alignment protrusion 337, aligns the outboard bearing within the wheel hub 301. The outboard retainer cap 320 also includes an engagement portion 339 and a retaining flange 340. The engagement portion 339 is configured to contact the outboard end 356 of the outboard bearing cone 317 when the outboard retainer cap 320 is installed onto a wheel hub and bearing assembly. The retaining flange 340 engages with the outboard bearing protector portion 331 of the outboard guard 321.

The outboard guard 321 engages the outboard retainer cap 320 to secure the outboard retainer cap 320 to the wheel hub and bearing assembly 300. The outboard retainer cap 320 is inserted through the outboard guard opening 333 and may be secured by an interference fit between a portion of the outboard retainer cap 320 and a portion of the outboard guard 321. For example, a contact surface 342 of the outboard guard 321 may engage with a contact surface 343 of the outboard retainer cap 320. Accordingly, the outboard guard 321 and the outboard retainer cap 320 preferably are each made of a semi-compliant material to allow the outboard retainer cap 320 to form an interference-type fit with the outboard guard 321.

Figure 11:
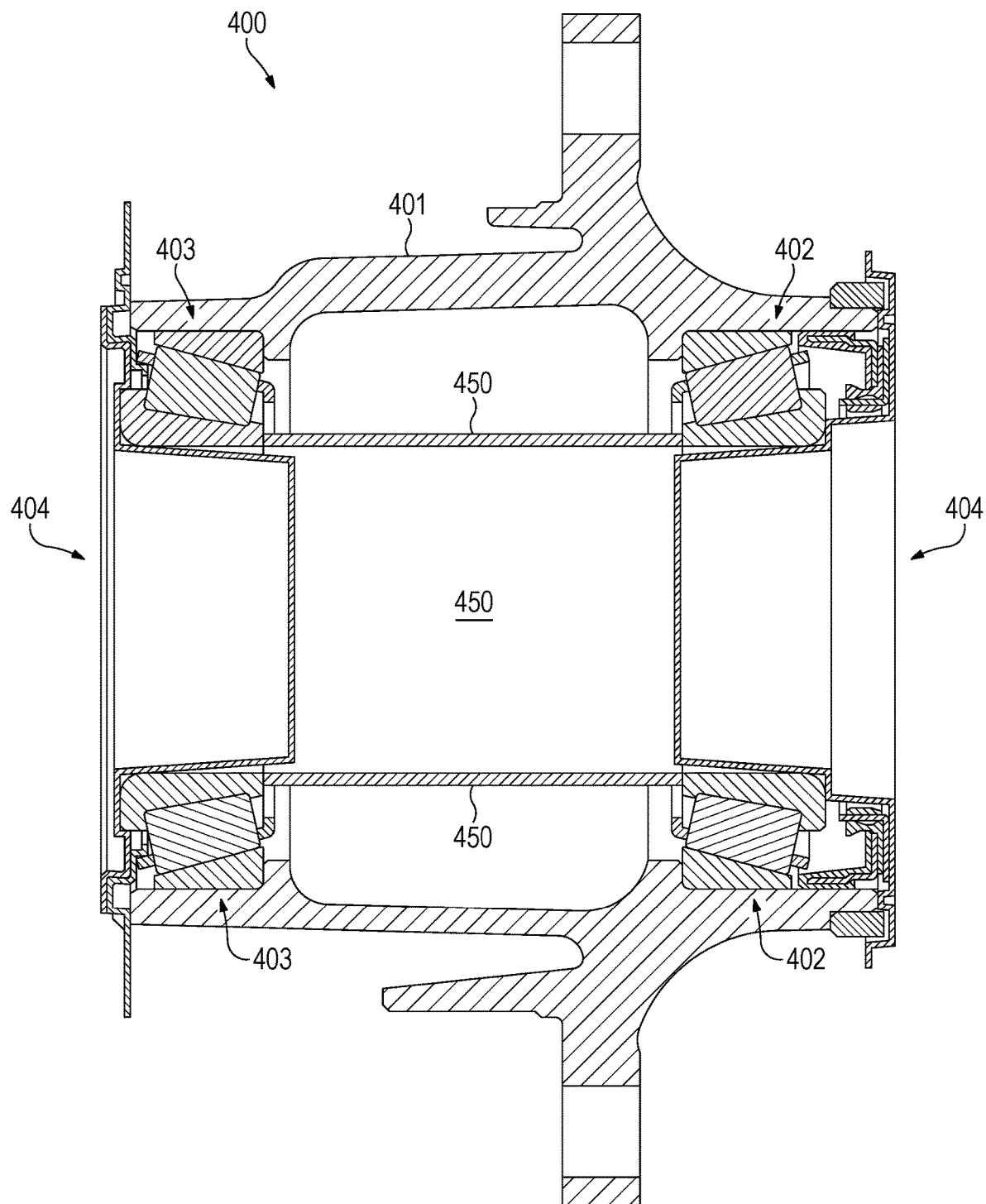
FIG. 11 is a cross-section of a wheel hub and bearing assembly having a spacer, according to embodiments of the invention.

FIG. 11 is a cross-sectional view showing material portions of a wheel hub and bearing assembly 400, according to embodiments of the invention. As illustrated in FIG. 11, a wheel hub and bearing assembly 400 may include a wheel hub 401, inboard bearings 402, outboard bearings 403, and packaging 404. The wheel hub 401, inboard bearings 402, outboard bearings 403, and packaging 404 are generally as described above for the respective items of FIG. 6-8, except that the inboard bearings 402 and the outboard bearings 403 of FIG. 11 do not have the extended cones of the inboard bearings 302 and the outboard bearings 303 of FIG. 6. Instead, the wheel hub and bearing assembly 400 includes a spacer element 450, which is generally as described above for the spacer element 250 of FIG. 5.

As noted above, proper alignment of the bearings within the wheel hub minimizes bearing wear and prevents premature bearing failure as well as premature failure of the wheel hub seal. The various embodiments of the packaging embodiments discussed here assist with maintaining proper alignment of the spacer element, the inboard bearing cone, or the outboard bearing cone within the wheel hub during transit of an uninstalled wheel hub and bearing assembly. The packaging also assists with maintaining proper alignment during installation of the wheel hub and bearing assembly onto a spindle.

In addition to providing protection from damage, the packaging, including the inboard guard, the outboard retainer cap, and the outboard guard, also helps to prevent or reduce contamination of the interior of the wheel hub and bearing assembly. Contamination, such as by dirt and debris, of the interior of the wheel hub and bearing assembly can cause premature wear of the inboard bearings and the outboard bearings and damage to the spacer seal. Preventing such contamination, from the time of assembly of the wheel hub and bearings until the assembly is installed onto a spindle, can be accomplished by installing the packaging to the assembly.

As noted above, the elements of the packaging can be constructed of a semi-compliant material, such as a plastic. Alternative materials can also be used based on the design of the packaging and the requirements of protecting the wheel hub and bearing assembly during transit and storage. Additionally, the packaging material can be recyclable or reusable, thus minimizing the waste generated from use of the packaging in a wheel hub and bearing assembly.

Batch identifying, or other identifying or promotional, information can be displayed on the various elements of the packaging, including the inboard guard, the outboard retainer cap, and the outboard guard. For example, information can be printed, embossed or otherwise placed onto various surfaces of the packaging elements. Among other things, the information may include instructions on how to mount the wheel hub and bearing assembly onto a spindle and how to remove the packaging from the assembly.

To install the wheel hub and bearing assembly onto a spindle, a user first removes the inboard guard from the assembly by grasping the inboard guard, such as the flange of the inboard guard, to extract the inboard guard from the inboard side of the wheel hub and bearing assembly. The wheel hub and bearing assembly is then slid onto the spindle from the inboard side, with the spindle contacting the alignment protrusion of the outboard retainer cap. Because of the force of the spindle against the outboard alignment protrusion, the outboard retainer cap disengages from the outboard guard, allowing the spindle to continue through the outboard guard opening and through the outboard side of the wheel hub and bearing assembly, thus mounting the assembly onto the spindle. Retaining the outboard retainer cap within the wheel hub and bearing assembly until disengaged by the spindle allows the guard to maintain the proper alignment of the outboard bearing within the wheel hub until the outboard bearing alignment is ensured by the inserted spindle. From this point, the installation depends on the type of packaging used.

For some types of packaging, such as the packaging 104 of FIG. 1 and the packaging 204 of FIG. 5, once properly seated onto the spindle, the outboard guard can be removed from the wheel hub and bearing assembly by grasping and pulling on the outboard guard, for example, at the pull tab of the outboard guard. Pulling on the pull tab exerts force on the retainer clips, extracting them from the hubcap mounting holes of the wheel hub and allowing the removal of the outboard guard from the mounted wheel hub and bearing assembly. Installation and securement of the wheel hub and bearing assembly onto the spindle can then be completed using a spindle nut, for example.

For other types of packaging, such as the packaging 304 of FIG. 6 and the packaging 404 of FIG. 11, the wheel hub and bearing assembly is secured onto the spindle with a spindle nut, for example. The spindle nut may be hand-tightened or fully torqued onto the spindle and against the outboard bearings. Then, the outboard guard can be removed from the wheel hub and bearing assembly by grasping and pulling on one or more of the pull tabs. Pulling on the pull tab exerts force on the retainer clips, extracting them from the hubcap mounting holes of the wheel hub and allowing the outboard guard to be removed from the mounted wheel hub and bearing assembly.

EXAMPLES

Illustrative examples of the disclosed technologies are provided below. An embodiment of the technologies may include one or more, and any combination of, the examples described below.

Example 1 includes a packaging system for a wheel hub assembly, the packaging system comprising an outboard guard and an outboard retainer cap, the outboard guard having a planform and comprising: an outboard guard opening comprising a substantially circular hole through the planform of the outboard guard, an engagement portion comprising an annular surface radially surrounding the outboard guard opening, an outboard bearing protector portion comprising an annular surface radially surrounding the engagement portion of the outboard guard, the annular surface of the outboard bearing protector portion being offset axially from the annular surface of the engagement portion of the outboard guard, and an outer rim comprising an annular surface radially surrounding the outboard bearing protector portion; and the outboard retainer cap being configured to be removably affixed to the outboard guard and comprising: an outboard alignment protrusion comprising a circular surface, an engagement portion comprising an annular surface radially surrounding the outboard alignment protrusion, the annular surface of the engagement portion of the outboard retainer cap being offset axially from the circular surface of the outboard alignment protrusion, and a retaining flange comprising an annular surface radially surrounding the engagement portion of the outboard retainer cap, the annular surface of the retaining flange being offset axially from the annular surface of the engagement portion of the outboard retainer cap.

Example 2 includes the packaging system of Example 1, in which the outboard guard further comprises one or more retainer clips about the outer rim of the outboard guard, the one or more retainer clips being configured to removably affix the outboard guard to a vehicle wheel hub when the outboard guard is installed on the vehicle wheel hub.

Example 3 includes the packaging system of Example 2, in which the retainer clips are integrated with the outer rim of the outboard guard.

Example 4 includes the packaging system of Example 2, in which the retainer clips are affixed to the outboard guard yet, separable from the outer rim of the outboard guard.

Example 5 includes the packaging system of any of Examples 1-4, in which the outboard guard further comprises a stiffening rib about the outer rim of the outboard guard, the stiffening rib comprising an arcuate surface raised axially from the outer rim of the outboard guard.

Example 6 includes the packaging system of any of Examples 1-5, in which the outboard guard further comprises a pull tab extending radially from the outer rim of the outboard guard, the pull tab being configured to allow a user to pinch the pull tab between the user's fingers.

Example 7 includes the packaging system of any of Examples 1-6, further comprising an inboard guard, the inboard guard comprising: an inboard alignment protrusion comprising a circular surface, an annular shelf radially surrounding the inboard alignment protrusion, the annular shelf being offset axially from the circular surface of the inboard alignment protrusion, an outer brim comprising an annular surface radially surrounding the annular shelf, the annular surface of the outer brim being offset axially from the annular shelf, and a ridge raised axially from the outer brim, the ridge being radially outward from the annular shelf.

Example 8 includes the packaging system of Example 7, in which the inboard guard further comprises a flange comprising an annular surface radially extending from the outer brim, the flange being configured to allow a user to pinch the flange between the user's fingers.

Example 9 includes a wheel hub assembly comprising: a vehicle wheel hub having a wheel hub bore configured to accept a vehicle spindle; an inboard bearing assembly installed on an inboard side of the vehicle wheel hub and comprising an inboard bearing cone and inboard bearing elements; an outboard bearing assembly installed on an outboard side of the vehicle wheel hub and comprising an outboard bearing cone and outboard bearing elements; and outboard packaging comprising an outboard retainer cap removably affixed within an outboard guard by an interference fit between the outboard retainer cap and the outboard guard, the outboard guard being removably affixed to an outboard side of the vehicle wheel hub and retaining the outboard bearing assembly within the vehicle wheel hub, a portion of the outboard retainer cap extending through an opening in the outboard guard and into the outboard side of the wheel hub bore of the vehicle wheel hub, the portion of the outboard retainer cap contacting an inner diameter of the outboard bearing cone to align the outboard bearing assembly within the wheel hub.

Example 10 includes the wheel hub assembly of Example 9, in which the outboard retainer cap contacts an outboard end of the outboard bearing cone.

Example 11 includes the wheel hub assembly of any of Examples 9-10, in which the outboard guard contacts the outboard bearing assembly.

Example 12 includes the wheel hub assembly of any of Examples 9-11, in which the outboard guard is removably affixed to the vehicle wheel hub by an interference fit between the outboard guard and the vehicle wheel hub.

Example 13 includes the wheel hub assembly of any of Examples 9-12, further comprising an inboard guard removably affixed to an inboard side of the vehicle wheel hub and retaining the inboard bearing assembly within the vehicle wheel hub, a portion of the inboard guard extending into the inboard side of the wheel hub bore of the vehicle wheel hub, the portion of the inboard guard contacting an inner diameter of the inboard bearing cone to align the inboard bearing assembly within the wheel hub, the inboard guard contacting an inboard end of the inboard bearing cone.

Example 14 includes the wheel hub assembly of Example 13, the wheel hub assembly further comprising a wheel hub seal on the inboard side of the vehicle wheel hub, in which the inboard guard does not contact an inboard side of the wheel hub seal.

Example 15 includes a method of installing a wheel hub assembly onto a vehicle spindle, the wheel hub assembly comprising a vehicle wheel hub having a wheel hub bore with an inboard side and an outboard side, the wheel hub bore being configured to accept the vehicle spindle, an inboard bearing assembly installed on an inboard side of the vehicle wheel hub and comprising an inboard bearing cone and inboard bearing elements, and an outboard bearing assembly installed on an outboard side of the vehicle wheel hub and comprising an outboard bearing cone and outboard bearing elements, the wheel hub assembly further comprising an outboard retainer cap removably affixed within an outboard guard by an interference fit between the outboard retainer cap and the outboard guard, the outboard guard being removably affixed to an outboard side of the vehicle wheel hub and retaining the outboard bearing assembly within the vehicle wheel hub, a portion of the outboard retainer cap extending through an opening in the outboard guard and into the outboard side of the wheel hub bore of the vehicle wheel hub, the wheel hub assembly further comprising an inboard guard removably affixed to an inboard side of the vehicle wheel hub and retaining the inboard bearing assembly within the vehicle wheel hub, the method comprising: removing the inboard guard from the inboard side of the vehicle wheel hub to expose the wheel hub bore; inserting the vehicle spindle into the wheel hub assembly from the inboard side of the wheel hub bore; disengaging the outboard retainer cap from the outboard guard by force of the vehicle spindle within the wheel hub bore and against the outboard retainer cap in an outboard direction; and continuing to insert the vehicle spindle into the wheel hub assembly until the vehicle spindle protrudes from the outboard side of the wheel hub bore.

Example 16 includes the method of Example 15, further comprising removing the outboard guard from the vehicle wheel hub before securing the wheel hub assembly onto the vehicle spindle.

Example 17 includes the method of Example 15, further comprising removing the outboard guard from the vehicle wheel hub after securing the wheel hub assembly onto the vehicle spindle.

Example 18 includes the method of any of Examples 16-17, in which removing the outboard guard from the vehicle wheel hub comprises pulling on one or more pull tabs of the outboard guard in the outboard direction to extract one or more retainer clips of the outboard guard from hubcap mounting holes of the vehicle wheel hub.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description refers to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Although specific embodiments of the invention have been illustrated and described for purposes of illustration, it will be understood that various modifications may be made without departing from the spirit and scope of the invention.

We claim:

1. A packaging system for a wheel hub assembly, the packaging system comprising an outboard guard and an outboard retainer cap,
    the outboard guard having a planform and comprising:
        an outboard guard opening comprising a substantially circular hole through the planform of the outboard guard,
        an engagement portion comprising an annular surface radially surrounding the outboard guard opening,
        an outboard bearing protector portion comprising an annular surface radially surrounding the engagement portion of the outboard guard, the annular surface of the outboard bearing protector portion being offset axially from the annular surface of the engagement portion of the outboard guard, and
        an outer rim comprising an annular surface radially surrounding the outboard bearing protector portion; and
    the outboard retainer cap being configured to be removably affixed to the outboard guard and comprising:
        an outboard alignment protrusion comprising a circular surface,
        an engagement portion comprising an annular surface radially surrounding the outboard alignment protrusion, the annular surface of the engagement portion of the outboard retainer cap being offset axially from the circular surface of the outboard alignment protrusion, and a retaining flange comprising an annular surface radially surrounding the engagement portion of the outboard retainer cap, the annular surface of the retaining flange being offset axially from the annular surface of the engagement portion of the outboard retainer cap.

2. The packaging system of claim 1, in which the outboard guard further comprises one or more retainer clips about the outer rim of the outboard guard, the one or more retainer clips being configured to removably affix the outboard guard to a vehicle wheel hub when the outboard guard is installed on the vehicle wheel hub.

3. The packaging system of claim 2, in which the retainer clips are integrated with the outer rim of the outboard guard.

4. The packaging system of claim 2, in which the retainer clips are affixed to the outboard guard yet, separable from the outer rim of the outboard guard.

5. The packaging system of claim 1, in which the outboard guard further comprises a stiffening rib about the outer rim of the outboard guard, the stiffening rib comprising an arcuate surface raised axially from the outer rim of the outboard guard.

6. The packaging system of claim 1, in which the outboard guard further comprises a pull tab extending radially from the outer rim of the outboard guard, the pull tab being configured to allow a user to pinch the pull tab between the user's fingers.

7. The packaging system of claim 1, further comprising an inboard guard, the inboard guard comprising:

an inboard alignment protrusion comprising a circular surface, an annular shelf radially surrounding the inboard alignment protrusion, the annular shelf being offset axially from the circular surface of the inboard alignment protrusion, an outer brim comprising an annular surface radially surrounding the annular shelf, the annular surface of the outer brim being offset axially from the annular shelf, and a ridge raised axially from the outer brim, the ridge being radially outward from the annular shelf.

8. The packaging system of claim 7, in which the inboard guard further comprises a flange comprising an annular surface radially extending from the outer brim, the flange being configured to allow a user to pinch the flange between the user's fingers.

* * * * *